United States Patent
Franz et al.

(10) Patent No.: US 11,047,283 B2
(45) Date of Patent: Jun. 29, 2021

(54) METHOD OF MONITORING AN SCR CATALYTIC CONVERTER

(71) Applicant: Robert Bosch GmbH, Stuttgart (DE)

(72) Inventors: Alexander Franz, Gaertringen (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 16/532,562

(22) Filed: Aug. 6, 2019

(65) Prior Publication Data
US 2020/0049048 A1 Feb. 13, 2020

(30) Foreign Application Priority Data

Aug. 9, 2018 (DE) ...................... 10 2018 213 379.4

(51) Int. Cl.
*F01N 3/20* (2006.01)
*F01N 11/00* (2006.01)

(52) U.S. Cl.
CPC ........... *F01N 3/208* (2013.01); *F01N 3/2026* (2013.01); *F01N 11/00* (2013.01); *F01N 2610/02* (2013.01)

(58) Field of Classification Search
CPC ...... F01N 11/00; F01N 13/008; F01N 3/2026; F01N 3/208; F01N 3/2066; F01N 2550/00; F01N 2550/02; F01N 2560/021; F01N 2560/026; F01N 2560/06; F01N 2610/02; F01N 2900/0412; F01N 2900/1616; F01N 2900/1622; F01N 2900/1818; Y02T 10/12; Y02T 10/40
USPC ................. 60/274, 277, 286, 295, 299–301
See application file for complete search history.

(56) References Cited

U.S. PATENT DOCUMENTS

| | | | |
|---|---|---|---|
| 2008/0178656 A1* | 7/2008 | Nieuwstadt | F01N 11/00 73/23.31 |
| 2010/0101214 A1* | 4/2010 | Herman | F01N 3/208 60/277 |
| 2012/0041596 A1 | 2/2012 | Thompson et al. | |

FOREIGN PATENT DOCUMENTS

| | | |
|---|---|---|
| DE | 10346220 | 4/2005 |
| DE | 102011109302 | 2/2012 |
| DE | 102012211722 | 1/2014 |
| DE | 102012220151 | 5/2014 |
| DE | 102013203579 | 9/2014 |

OTHER PUBLICATIONS

Machine Translation DE 10 2012 220 151 (Year: 2020).*

* cited by examiner

*Primary Examiner* — Audrey K Bradley
*Assistant Examiner* — Dapinder Singh
(74) *Attorney, Agent, or Firm* — Michael Best & Friedrich LLP

(57) ABSTRACT

The invention concerns a method for monitoring an SCR catalytic converter in an exhaust line of an internal combustion engine, into which a reducing agent solution for the reduction of nitrogen oxides is dosed, wherein the SCR catalytic converter is diagnosed as defective if a measured variable is below a corresponding threshold and wherein the diagnosis of the SCR catalytic converter occurs when enabling criteria are met, wherein the enabling criteria are selected depending on a BPU model and a WPA model such that when the SCR catalytic converter (3) conforms to the BPU model, ammonia slip occurs through this SCR catalytic converter (3), and when the SCR catalytic converter corresponds to the WPA model, no ammonia slip occurs through this SCR catalytic converter.

14 Claims, 3 Drawing Sheets

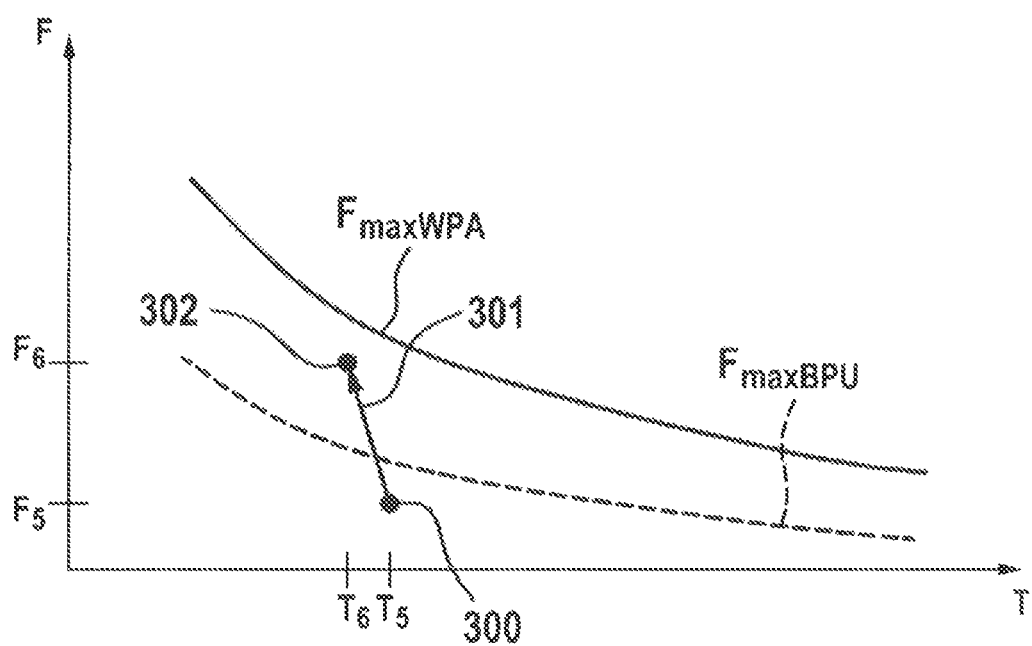

METHOD OF MONITORING AN SCR CATALYTIC CONVERTER

BACKGROUND OF THE INVENTION

The present invention concerns a method for monitoring an SCR catalytic converter by means of ammonia slip. The invention further concerns a computer program that carries out every step of the method when it is running on a computing device, and a machine-readable memory medium that stores the computer program. Finally, the invention concerns an electronic control unit that is arranged to carry out the method according to the invention.

Nowadays, the SCR method (Selective Catalytic Reduction) is used in the aftertreatment of exhaust gases from a combustion engine to reduce nitrogen oxides ($NO_x$) in the exhaust gas. DE10346220A1 describes the basic principle. In doing so a 32.5% urea water solution (HWL), also known commercially as AdBlue®, will be dosed into the exhaust gas. Typically, a dosing system with a dosing module is provided for this in order to dose the HWL into the exhaust gas upstream of an SCR catalytic converter. Ammonia separates out from the HWL and is then bound into the reactive surface of the SCR catalytic converter. There the ammonia combines with the nitrogen oxides, from which water and nitrogen are produced. The HWL is transported by means of a transport module from a reducing agent tank through a pressure line to the dosing module.

As an important component in pollutant reduction, the SCR catalytic converter is used to reduce pollutants by means of on-board diagnosis (OBD), also in order to comply with legal regulations. During monitoring, a so-called WPA model (worst performance acceptable) and a so-called BPU model (best performance unacceptable) are used to evaluate the functional ability. If the SCR catalytic converter reaches or exceeds the assessment values provided in the WPA model, it can be considered as completely intact. If the SCR catalytic converter falls below the assessment values provided in the BPU model, it must definitely be considered as defective. If the assessment values lie between the WPA model and the BPU model, this indicates damage to the SCR catalytic converter, the damage remaining within an acceptable range in which service measures do not necessarily have to be carried out.

SUMMARY OF THE INVENTION

A method for monitoring an SCR catalytic converter in an exhaust gas line of an internal combustion engine is proposed. In order to reduce nitrogen oxides that are produced during the combustion of fuel in the internal combustion engine by means of the SCR catalytic converter, a reducing agent solution is dosed in. The reducing agent is, for example, a urea-water solution from which ammonia (NH3) is split off. As part of the SCR catalytic converter monitoring process, a measured SCR catalytic converter parameter is determined. As part of the monitoring, a diagnosis of the SCR catalytic converter takes place when enabling criteria are met. The enabling criteria are chosen based on a BPU model and a WPA model to distinguish the state of the SCR catalytic converter for the two cases. The enabling criteria are selected so that ammonia slip occurs through the SCR catalytic converter if it conforms to the BPU model and no ammonia slip occurs through the SCR catalytic converter if it matches the WPA model. The SCR catalytic converter is diagnosed as defective if the measured magnitude is below a reasonable threshold.

It is comparatively easy to determine whether or not ammonia slip occurs, so that appropriate enabling criteria are presented which allow a better distinction between an SCR catalytic converter according to the BPU model and an SCR catalytic converter according to the WPA model. In other words, in this case enabling criteria are specified that are particularly well suited to the observation of the SCR catalytic converter or its state.

The ammonia slip changes with the ammonia storage capacity of the SCR catalytic converter. If the ammonia storage capacity is reduced, the ammonia can no longer be completely absorbed by the SCR catalytic converter and react there with the nitrogen oxides in the exhaust gas. Instead, the ammonia passes through the SCR catalytic converter causing ammonia slip.

In the following, different enabling criteria are presented with which the aforementioned distinction with respect to ammonia slip can be made. It can be provided that the diagnosis takes place if one of the enabling criteria is met or if several enabling criteria, optionally also all enabling criteria, are met:

According to one aspect, an enabling criterion is met when the SCR catalytic converter according to the BPU model has a maximum ammonia storage capacity that is insufficient to store all of the ammonia converted from the reducing agent and if at the same time the SCR catalytic converter according to the WPA model has a maximum ammonia storage capacity that is sufficient to store all of the ammonia converted from the reducing agent.

According to one aspect, an enabling criterion is met when the absolute temperature of the SCR catalytic converter is above a temperature threshold. Depending on the temperature, the ammonia storage capacity changes such that ammonia slip occurs at an operating point according to the BPU model and no ammonia slip occurs according to the WPA model. Therefore, ammonia slip is to be expected from the above-mentioned temperature threshold.

In accordance with another aspect, an enabling criterion is met when the temperature gradient of the SCR catalytic converter is above a first temperature gradient threshold. This is advantageous because with an increasing temperature of the SCR catalytic converter the ammonia storage capacity thereof decreases. In addition, the temperature gradient can be limited at the upper end by a second temperature gradient threshold. The second temperature gradient threshold is above the first temperature threshold. The temperature gradient thresholds can be set depending on the respective absolute temperature. A slow temperature change, which is expressed by a small temperature gradient, is normally compensated by the dosing strategy. Therefore, a diagnosis is especially useful when rapid adjustments to the temperature are made.

According to one aspect, an enabling criterion is met when a modeled fill level determined from a model for the ammonia fill level of the SCR catalytic converter is above a first fuel level threshold at a given temperature and below a second fuel level threshold. The first fill level threshold represents the maximum ammonia storage capacity of the SCR catalytic converter according to the BPU model at a given temperature and the second fill level threshold represents the maximum ammonia storage capacity of the SCR catalytic converter according to the WPA model for a given temperature. Optionally, the difference between the first fill level threshold and the second fill level threshold can be considered. Another enabling criterion is met when the difference between the first voltage threshold and the second voltage threshold is above a threshold. In other words, the diagnosis is enabled on the basis of the above-mentioned threshold values if the difference of the two threshold values is large enough to allow a statement to be made about the diagnosis.

According to one aspect, overdosing of the reducing agent component for the respective SCR catalytic converter can be recognized. In this case, an overdosing mass is determined in relation to the stochiometric mass required by the SCR for converting the nitrogen oxides. In other words, the overdosing mass is calculated as the difference between the actual dosed reducing agent mass and the stochiometric mass provided for the SCR. In addition, a model can be used to determine the mass needed to convert the nitrogen oxides. An enabling criterion is met when the overdosing mass is above an overdosing threshold. When this overdosing threshold is exceeded, a maximum ammonia storage capacity of the SCR catalytic converter according to the BPU model is insufficient to store all of the ammonia converted from the reducing agent. On the other hand, a maximum ammonia storage capacity of the SCR catalytic converter for the WPA model readily suffices to store all of the ammonia converted from the reducing agent. With the additional modeling of an ammonia fill level value of the SCR catalytic converter according to the BPU model, the accuracy of the diagnostic procedure can be improved, as the overdosing threshold at which the ammonia storage capacity of the BPU is exceeded can be more accurately determined.

According to one aspect, an enabling criterion is met when a model for the ammonia according to the BPU model predicts an ammonia slip of the catalytic converter. Accordingly, the enabling criterion can be determined directly from the model.

According to another aspect, an enabling criterion is met when a difference between a model for the ammonia slip according to the BPU model and a model for the ammonia slip according to the WPA model exceeds a model threshold. The model threshold is advantageously chosen so that a diagnosis is made only if the difference in the ammonia slip between an SCR catalytic converter according to a BPU model and an SCR catalytic converter according to the WPA model reaches this model threshold to allow a meaningful diagnosis.

The term "measured" here means that the variable is measured directly or is determined directly from measured variables.

The measured variable may be an ammonia concentration downstream of the SCR catalytic converter and/or an ammonia mass flow downstream of the SCR catalytic converter and/or a sensor signal of a nitrogen oxide sensor downstream of the SCR catalytic converter and/or a sensor signal of a nitrogen oxide sensor downstream of the SCR catalytic converter, wherein the nitrogen oxide sensors output a combined sensor signal of nitrogen oxide and ammonia due to their cross-sensitivity to ammonia.

Furthermore, a conversion rate of the SCR catalytic converter—alternatively often also referred to as efficiency—is determined for example from the sensor signal of the nitrogen oxide sensor downstream of the SCR catalytic converter and the sensor signal of the nitrogen oxide sensor upstream of the SCR catalytic converter. Alternatively or additionally, an ammonia sensor can be used. Furthermore, the conversion rate can be determined in advance from a combination of the two options described above.

According to one aspect, the monitoring is terminated when an integrated exhaust mass exceeds an associated exhaust mass threshold. Since the ammonia slip is finite in the normal case, the period of monitoring can advantageously be limited after detection of this situation and the monitoring can be adjusted.

A computer program is set up to perform each step of the process, especially when executed on a computer or controller. It allows the implementation of the procedure in a conventional electronic control unit, without having to make any structural changes thereto. For this purpose it is stored on the machine-readable memory medium.

By loading the computer program onto a conventional electronic control unit, the electronic control unit is obtained that is set up to carry out monitoring of an SCR catalytic converter.

BRIEF DESCRIPTION OF THE DRAWINGS

Embodiments of the invention are illustrated in the drawings and explained in more detail in the following description.

FIG. 5 shows a diagram of the maximum ammonia storage capacity of an SCR catalytic converter according to a WPA model and according to a BPU model as a function of the temperature of the SCR catalytic converter and with an exemplary ammonia slip situation due to a temporary overdose.

DETAILED DESCRIPTION

Figure 1:
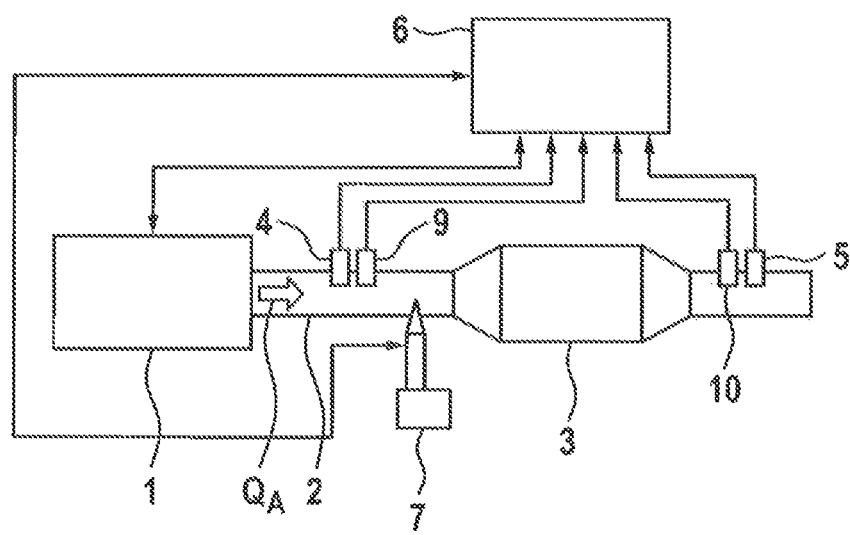
FIG. 1 shows a schematic representation of an SCR catalytic converter in an exhaust system of a combustion engine, which is monitored by means of an embodiment of the method according to the invention.

FIG. 1 shows a schematic representation of an internal combustion engine 1, an exhaust gas line 2 and an exhaust aftertreatment system with an SCR catalytic converter 3 that is monitored by means of an embodiment of the method according to the invention. An exhaust mass flow $Q_A$ emitted by the internal combustion engine 1 is transported from the internal combustion engine 1 via the exhaust gas line 2 to the exhaust gas aftertreatment system. The internal combustion engine 1 is controlled by an electronic control unit 6. The urea water solution required for the reduction of nitrogen oxides in the SCR catalytic converter 3 is injected into the exhaust line 2 upstream of the SCR catalytic converter 3 via a dosing valve 8 by means of a known transport and dosing system 7. The transport and dosing system 7 and the dosing valve 8 are actuated by the electronic control unit 6. In addition, a first nitrogen oxide sensor 4 upstream of the SCR catalytic converter 3 is disposed upstream of the dosing valve 8. The first nitrogen oxide sensor 4 measures the nitrogen oxide concentration in the exhaust gas upstream of the SCR catalytic converter 3 and forwards the measurement result to the electronic control unit 6. Furthermore, a second nitrogen oxide sensor 5 is disposed downstream of the SCR catalytic converter 3 and measures the nitrogen oxide concentration in the exhaust gas downstream of the SCR catalytic converter 3, wherein the nitrogen sensor 5 has a cross-sensitivity to ammonia, and also passes the measurement result to the electronic control unit 6. In addition, a first temperature sensor 9 upstream of the SCR catalytic converter 3 is disposed upstream of the dosing valve 8, and a second temperature sensor 10 is disposed downstream of the SCR catalytic converter 3. By means of the control unit 6, the transport and dosing system 7 and the dosing valve 8 are controlled and the required mass of urea-water solution is dosed into the exhaust line 2 as a function of the determined nitrogen concentrations in the exhaust gas.

Figure 2:
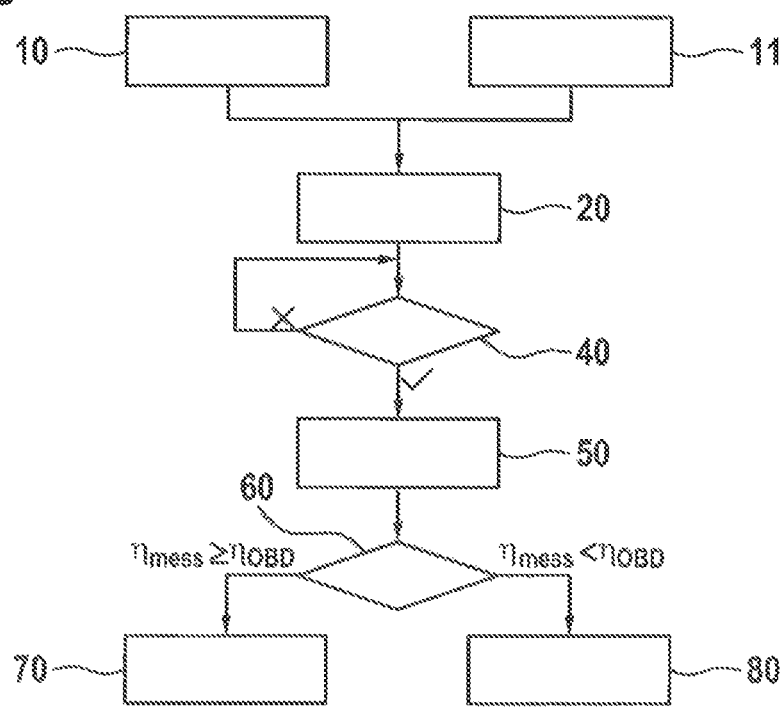
FIG. 2 shows a flow chart of an exemplary embodiment of the method according to the invention with the use of the additional enabling condition designed for $NH_3$.

FIG. 2 shows a flow chart of an exemplary embodiment of the method according to the invention for the monitoring the SCR catalytic converter 3 depending on a selected dosing strategy. First, a model 10 for maximum ammonia storage capacity $F_{maxWPA}$ according to a WPA model and a model 11 for a maximum ammonia storage capacity $F_{maxBPU}$ according to a BPU model are provided. Said models 10, 11 can be calculated as part of a diagnostic function. Optionally, the model 10 may also be calculated as part of a dosing strategy according to the WPA model. Alternatively, the modeled ammonia fill level can also be determined independently of the dosing strategy.

Figure 3:
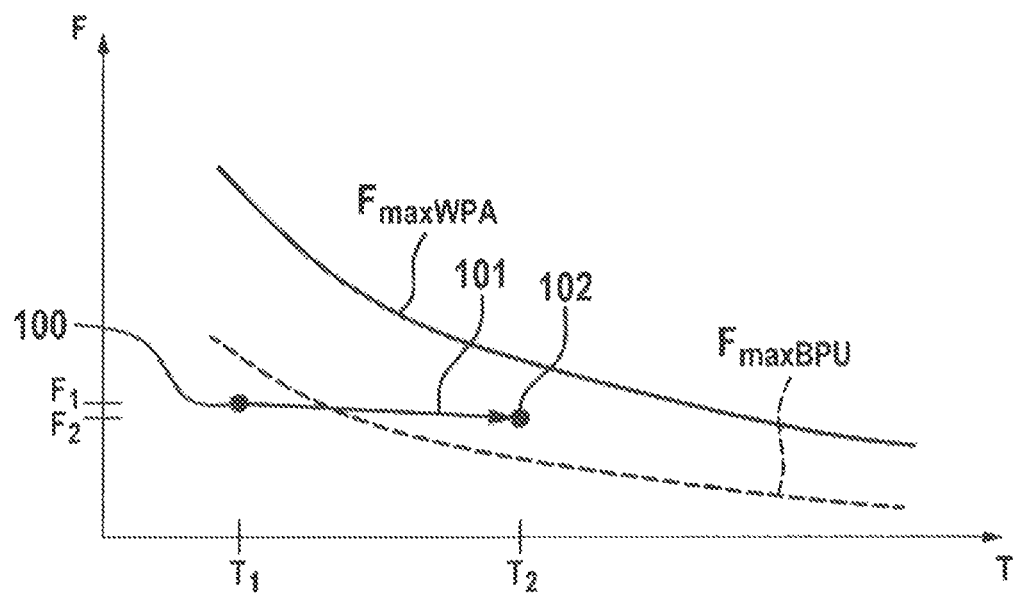
FIG. 3 shows a graph of the maximum ammonia storage capacity of an SCR catalytic converter according to a WPA model and according to a BPU model as a function of the temperature of the SCR catalytic converter and an exemplary ammonia slip situation due to a temperature increase.
Figure 4:
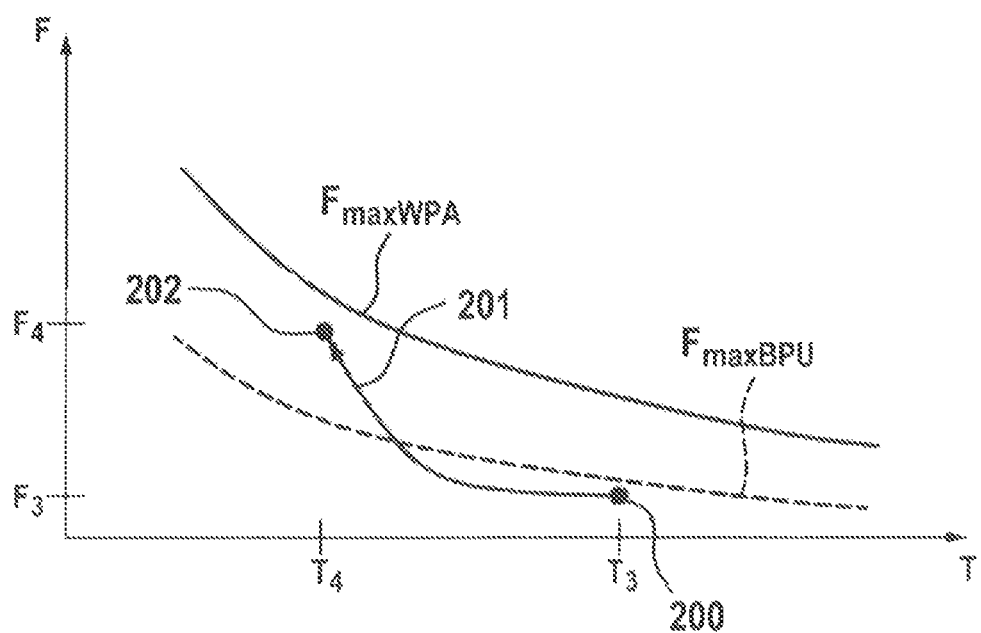
FIG. 4 shows a diagram of the maximum ammonia storage capacity of an SCR catalytic converter according to a WPA model and according to a BPU model as a function of the temperature of the SCR catalytic converter and with an exemplary ammonia slip situation due to an increase in the ammonia fill level predetermined by a dosing strategy.

In a further process step 20, relevant enabling criteria, which are explained in the description of FIGS. 3 to 5, are determined for an SCR catalytic converter according to the WPA model and according to the BPU model. Relevant enabling criteria may be, for example, the temperature T of the SCR catalytic converter 3, the gradient of the temperature of the SCR catalytic converter 3, the modeled ammonia and the overdose mass. As part of a comparison 40 the modeled maximum ammonia storage capacity $F_{maxWPA}$ according to the WPA model and the maximum ammonia storage capacity $F_{maxBPU}$ according to the BPU model are compared with the enabling criteria. If an enabling criterion is met, the diagnosis is carried out. In further exemplary embodiments, it may be provided that several and, as a special case, all enabling criteria are met before the diagnosis takes place. If, on the other hand, no enabling criteria or insufficient enabling criteria are met, no diagnosis is carried out. In this case, the comparison 40 is performed again. In further exemplary embodiments, the enabling criteria can be changed or replaced. During the diagnosis, in a next process step 50, a current conversion rate $\eta_{mess}$ is measured by means of the nitrogen oxide sensors 4, 5 in the exhaust line and compared in a further comparison 60 with an associated threshold $\eta_{OBD}$. If the measured conversion rate $\eta_{mess}$ is above the threshold $\eta_{OBD}$ or if it corresponds to it, the SCR catalytic converter 3 is diagnosed as functioning 70. If the conversion rate $\eta_{mess}$ is below the threshold $\eta_{OBD}$, the SCR catalytic converter 3 is diagnosed as defective 80.

FIG. 3 shows a graph of the ammonia fill level F of an SCR catalytic converter 3 as a function of the temperature T of the SCR catalytic converter 3. The temperature-dependent curve of the maximum ammonia storage capacity $F_{maxWPA}$ of the SCR catalytic converter 3 is shown according to the WPA model and the temperature-dependent curve of the maximum ammonia storage capacity $F_{maxBPU}$ of the SCR catalytic converter 3 is shown according to the BPU model. The curve of the maximum ammonia storage capacity $F_{maxWPA}$ according to the WPA model lies above the curve of the maximum ammonia storage capacity $F_{maxBPU}$ according to the BPU model, since it is generally assumed that an SCR catalytic converter according to the WPA model can store more ammonia than the SCR catalytic converter according to the BPU model. The graph shows two operating points 100, 102. The first operating point is at a first temperature $T_1$ and at an associated first ammonia fill level $F_1$ and lies below the curve of the maximum ammonia storage capacity $F_{maxBPU}$ of an SCR catalytic converter 3 according to a BPU model, so that at this first operating point 100 no ammonia slip is expected. If the temperature of the SCR catalytic converter 3 increases to a second temperature $T_2$, the ammonia fill level of the SCR catalytic converter 3 decreases insignificantly along the arrow 101 from the first ammonia fuel level $F_1$ to the second ammonia fill level $F_2$. This is now the second operating point 102 at the second temperature $T_2$ and the second ammonia fill level $F_2$. The second operating point 102 thus lies in a corridor above the curve of the maximum ammonia storage capacity $F_{maxBPU}$ of an SCR catalytic converter 3 according to a BPU model and below the curve of the maximum storage capacity $F_{maxWPA}$ of an SCR catalytic converter 3 according to a WPA model. As a result, a high ammonia slip is to be expected in the case of the SCR catalytic converter 3 in accordance with a BPU model and at most a slight slip in the case of an SCR catalytic converter 3 according to a WPA model. At the second operating point 102, an enabling criterion for the enabling of the diagnosis is consequently met.

FIG. 4 shows a graph of the ammonia fill level F of an SCR catalytic converter 3 as a function of the temperature T of the SCR catalytic converter 3. The temperature-dependent curve of the maximum ammonia storage capacity $F_{maxWPA}$ of the SCR catalytic converter 3 according to the WPA model is shown and the temperature-dependent curve of the maximum ammonia storage capacity $F_{maxBPU}$ of the SCR catalytic converter 3 according to the BPU model is shown. The curve of the maximum ammonia storage capacity $F_{maxWPA}$ of an SCR catalytic converter 3 according to the WPA model lies, as already described in FIG. 3, above the curve of the maximum storage capacity $F_{maxBPU}$ of an SCR catalytic converter 3 according to the BPU model. The graph shows two further operating points 200, 202. The first operating point is located at a third temperature $T_3$ and an associated third ammonia fill level $F_3$ and is below the curve of the maximum ammonia storage capacity $F_{maxBPU}$ of the SCR catalytic converter 3 according to a BPU model, so again no ammonia slip is expected. A defined mass of the urea-water solution is dosed into the exhaust gas line and the temperature T of the SCR catalytic converter 3 decreases from the third temperature $T_3$ to the fourth temperature $T_4$. As a result, the ammonia fill level of the SCR catalytic converter 3 rises along the arrow 201 from the third ammonia fill level $F_3$ to the fourth ammonia fill level $F_4$. This is now the fourth operating point 202 at the fourth temperature $T_4$ and the fourth ammonia fill level $F_4$. The fourth operating point 202 thus lies in a corridor above the curve of the maximum ammonia storage capacity $F_{maxBPU}$ of an SCR catalytic converter 3 according to a BPU model and below the curve of the maximum storage capacity $F_{maxWPA}$ of an SCR catalytic converter 3 according to a WPA model. As a result, a high slip is to be expected in the case of the SCR catalytic converter 3 according to a BPU model and at most a slight slip in the case of an SCR catalytic converter 3 according to a WPA model. At the fourth operating point 202, an enabling criterion for the enabling of the diagnosis is thus met.

FIG. 5 shows a graph of the ammonia fill level F of an SCR catalytic converter 3 as a function of the temperature T of the SCR catalytic converter 3. The temperature-dependent curve of the maximum ammonia storage capacity $F_{maxWPA}$ of the SCR catalytic converter 3 according to the WPA model is shown and the temperature-dependent curve of the maximum ammonia storage capacity $F_{maxBPU}$ of the SCR catalytic converter 3 according to the BPU model is shown. The curve of the maximum ammonia storage capacity $F_{maxWPA}$ of the SCR catalytic converter 3 according to the WPA model lies above a curve of the maximum storage capacity $F_{maxBPU}$ of the SCR catalytic converter 3 in accordance with the BPU model, since it is assumed that the SCR catalytic converter 3 according to the WPA model can store more ammonia than the SCR catalytic converter according to the BPU model. The graph shows two further operating points 300, 302. The first operating point is at a fifth temperature $T_5$ and an additional fifth ammonia fill level $F_5$ and lies below the curve of the maximum ammonia storage capacity $F_{maxBPU}$ of the SCR catalytic converter 3 according to the BPU model, so that again no ammonia slip is to be expected. A defined mass of urea-water solution is dosed into the exhaust line that is greater than the mass of urea-water solution required for a conversion of nitrogen oxides in the exhaust gas. As a result, the ammonia fill level of the SCR catalytic converter 3 increases sharply from the fifth ammonia fill level $F_5$ to the sixth ammonia fill level $F_6$ along the arrow 301. At the same time, the temperature T of the SCR catalytic converter 3 decreases from the fifth temperature $T_5$ to the sixth temperature $T_6$. This is now the sixth operating point 302 at the sixth temperature $T_6$ and the sixth ammonia fill level $F_6$. The sixth operating point 302 thus lies in a corridor above the curve of the maximum ammonia storage capacity $F_{maxBPU}$ of an SCR catalytic converter 3 according to the BPU model and below the curve of the maximum ammonia storage capacity $F_{maxWPA}$ of the SCR catalytic converter 3 according to the WPA model. As a result, a high slip is expected in the SCR catalytic converter 3 according to the BPU model, whereas it can be assumed that the SCR catalytic converter according to the WPA model can still store the excess ammonia. At the sixth operating point $F_6$, an enabling criterion for the enabling of the diagnosis is thus met.

The invention claimed is:

1. A method for monitoring an SCR catalytic converter (3) in an exhaust system (2) of an internal combustion engine (1), into which a reducing agent solution for reducing nitrogen oxides is dosed, the method comprising:
    selecting (20), based on a BPU model and a WPA model, enabling criteria; and
    when one or more of the enabling criteria is met, diagnosing the SCR catalytic converter (3) as defective (80) when a measured value ($\eta_{mess}$) is below a corresponding threshold ($\eta_{OBD}$), wherein the enabling criteria is selected such that ammonia slip occurs through the SCR catalytic converter (3) when the SCR catalytic converter (3) conforms to the BPU model, and no ammonia slip occurs through the SCR catalytic converter (3) when the SCR catalytic converter (3) corresponds to the WPA model.

2. The method according to claim 1, characterized by an enabling criterion that is met when the SCR catalytic converter (3) has a maximum ammonia storage capacity ($F_{maxBPU}$) according to the BPU model which is insufficient to store all of the ammonia converted by the reducing agent and if the SCR catalytic converter according to the WPA model has a maximum ammonia storage capacity ($F_{maxWPA}$) sufficient to store all of the ammonia converted by the reducing agent.

3. The method according to claim 1, characterized by an enabling criterion that is met when the absolute temperature of the SCR catalytic converter (1) is above a temperature threshold.

4. The method according to claim 1, characterized by an enabling criterion that is met when the gradient of the temperature of the SCR catalytic converter (3) is above a first temperature gradient threshold.

5. The method according to claim 4, characterized by an enabling criterion that is met if the gradient of the temperature of the SCR catalytic converter (3) is below a second temperature gradient threshold that is above the first temperature gradient threshold.

6. The method according to claim 1, characterized by an enabling criterion that is met when a modeled ammonia fill level value determined from a model for the ammonia potential of the SCR catalytic converter (3) lies above a first ammonia fill level threshold that represents the maximum ammonia storage capacity ($F_{maxBPU}$) of the SCR catalytic converter (3) according to the BPU model, and below a second ammonia storage threshold value that represents the maximum ammonia storage capacity ($F_{maxWPA}$) of the SCR catalytic converter (3) according to the WPA model.

7. The method according to claim 1, characterized by an enabling criterion that is met when a dosed reducing agent mass is above an upper dosing threshold at which a maximum ammonia storage capacity ($F_{maxBPU}$) of the SCR catalytic converter (3) in accordance with the BPU model is insufficient to store all of the ammonia converted by the reducing agent and the maximum ammonia storage capacity ($F_{maxWPA}$) of the SCR catalytic converter (3) according to the WPA model is sufficient to store all the ammonia converted by the reducing agent.

8. The method according to claim 1, characterized by an enabling criterion that is met when a model for the ammonia slip according to the BPU model predicts ammonia slip of the SCR catalytic converter (3).

9. The method according to claim 1, characterized by an enabling criterion that is met when a difference between an ammonia slip model for the BPU model and an ammonia slip model for the WPA model exceeds a model threshold.

10. The method according to claim 1, characterized in that the measured variable is one or more of the following variables or is determined directly therefrom:
    an ammonia concentration downstream of the SCR catalytic converter (3);
    an ammonia mass flow downstream of the SCR catalytic converter (3);
    a sensor signal of a nitrogen oxide sensor downstream of the SCR catalytic converter (3); and/or
    a sensor signal of a nitrogen oxide sensor upstream of the SCR catalytic converter (3).

11. The method according to claim 10, characterized in that the measured variable is a measured conversion rate ($\eta_{mess}$) of the SCR catalytic converter (3) that is determined from a sensor signal of a nitrogen oxide sensor (5) or an ammonia sensor downstream of the SCR catalytic converter (3) and a sensor signal of a nitrogen oxide sensor (4) or an ammonia sensor upstream of the SCR catalytic converter (3).

12. The method according to claim 1, characterized in that the monitoring is terminated when an integrated exhaust gas mass exceeds an associated exhaust gas mass threshold value.

13. A non-transitory machine-readable storage medium having a computer program that is configured to perform each step of the method according to claim 1.

14. An electronic control unit that is configured to carry out monitoring of an SCR catalytic converter (3) by the method according to claim 1.

\* \* \* \* \*